(12) United States Patent
VanNahmen

(10) Patent No.: US 10,582,661 B2
(45) Date of Patent: Mar. 10, 2020

(54) SYSTEM AND METHOD FOR CONVERTING CUTTING AND GATHERING SYSTEM OF A CORN HEAD

(71) Applicant: Kopper Kutter, LLC, Cimarron, KS (US)

(72) Inventor: Alan G. VanNahmen, Manhattan, KS (US)

(73) Assignee: Kopper Kutter, LLC, Cimarron, KS (US)

( * ) Notice: Subject to any disclaimer, the term of this patent is extended or adjusted under 35 U.S.C. 154(b) by 269 days.

(21) Appl. No.: 15/832,525

(22) Filed: Dec. 5, 2017

(65) Prior Publication Data

US 2018/0192588 A1 Jul. 12, 2018

Related U.S. Application Data

(63) Continuation-in-part of application No. 15/383,959, filed on Dec. 19, 2016, now Pat. No. 10,123,480.
(Continued)

(51) Int. Cl.
*A01D 42/00* (2006.01)
*A01D 75/00* (2006.01)
(Continued)

(52) U.S. Cl.
CPC ........... *A01D 42/00* (2013.01); *A01D 41/142* (2013.01); *A01D 45/023* (2013.01); *A01D 47/00* (2013.01);
(Continued)

(58) Field of Classification Search
CPC .... A01D 42/00; A01D 42/005; A01D 41/142; A01D 34/00–905; A01D 43/081;
(Continued)

(56) References Cited

U.S. PATENT DOCUMENTS 1,943,201 A * 1/1934 Bueker .................. A01D 34/73
56/102
2,139,883 A * 12/1938 Curry ................... A01D 45/021
56/56
(Continued)

OTHER PUBLICATIONS

Geringhoff Releases the New Milo Star Header for Grain Sorghum Producers, PRNewswire, Nov. 20, 2015, 4 pages, http://www.prnewswire.com/news-releases/geringhoff-releases-the-new-milo-star-header-fo . . . Accessed May 9, 2017.
(Continued)

*Primary Examiner* — Alicia Torres
*Assistant Examiner* — Adam J Behrens
(74) *Attorney, Agent, or Firm* — Husch Blackwell LLP

(57) ABSTRACT

A system for modifying a row unit of a harvesting head, the system including at least one cutting disk, a right angle gear set configured for being drivingly connected to the cutting disk, and a drive shaft between a row unit gear box and the right angle gear set. The system may drive two counter-rotating cutting disks that can be positioned either at near the rear or the front of the row unit. A method for modifying the row unit includes removing existing stalk rolls and housings, installing a cover plate over a gearbox to which the housings were mounted, removing existing trash knives, drilling holes in the row unit frame for mounting the cutting disks, installing the cutting disks.

13 Claims, 10 Drawing Sheets

Related U.S. Application Data

(60) Provisional application No. 62/430,153, filed on Dec. 5, 2016, provisional application No. 62/386,970, filed on Dec. 18, 2015.

(51) Int. Cl.
*A01D 47/00* (2006.01)
*A01D 41/14* (2006.01)
*A01D 45/02* (2006.01)
*A01D 45/22* (2006.01)
*A01D 45/00* (2018.01)

(52) U.S. Cl.
CPC .............. *A01D 75/00* (2013.01); *A01D 45/00* (2013.01); *A01D 45/003* (2013.01); *A01D 45/021* (2013.01); *A01D 45/22* (2013.01)

(58) Field of Classification Search
CPC .... A01D 43/082; A01D 43/083; A01D 47/00; A01D 75/00; A01D 45/00; A01D 45/003; A01D 45/021; A01D 45/22
See application file for complete search history.

(56) References Cited

U.S. PATENT DOCUMENTS

| | | | | |
|---|---|---|---|---|
| 2,372,569 A * | 3/1945 | Hahn | ................... | A01D 45/021 56/107 |
| 2,527,190 A * | 10/1950 | Kuhlman | ............. | A01D 45/021 460/28 |
| RE25,991 E * | 3/1966 | Gorham | ............... | A01D 43/081 56/503 |
| 3,404,516 A * | 10/1968 | Carlson | ................... | A01D 45/02 56/10.3 |
| RE27,528 E * | 11/1972 | Looker | ................ | A01D 45/006 171/1 |
| 4,048,792 A * | 9/1977 | Shriver | ................ | A01D 43/082 56/98 |
| 4,086,749 A * | 5/1978 | Greiner | ................ | A01D 43/082 56/106 |
| 4,212,146 A * | 7/1980 | Eistert | ................... | A01D 43/082 56/13.6 |
| RE31,064 E * | 10/1982 | Shriver | ................ | A01D 43/082 56/106 |
| 4,397,134 A * | 8/1983 | Lausch | ................ | A01D 43/082 56/98 |
| 4,419,856 A * | 12/1983 | Taylor | ................... | A01D 41/147 56/1 |
| 4,543,774 A * | 10/1985 | Arnold | ................... | A01D 34/66 56/98 |
| 5,546,737 A * | 8/1996 | Moosbrucker | ....... | A01D 45/006 56/94 |
| 7,874,134 B1 * | 1/2011 | Hoffman | .............. | A01D 45/023 56/119 |
| 7,937,918 B1 * | 5/2011 | Mossman | .............. | A01D 43/08 56/11.7 |
| 10,225,982 B2 * | 3/2019 | Missotten | ............ | A01D 45/023 |
| 2011/0011048 A1 * | 1/2011 | Hoffman | .............. | A01D 45/023 56/119 |
| 2017/0055448 A1 * | 3/2017 | Missotten | ............ | A01D 43/083 |

OTHER PUBLICATIONS

MiloStar, https://web.archive.org/web/20160707235503/https://geringhoff.com/products/milostad/, 2 pages. Accessed May 9, 2017.

* cited by examiner

SYSTEM AND METHOD FOR CONVERTING CUTTING AND GATHERING SYSTEM OF A CORN HEAD

CROSS-REFERENCE TO RELATED APPLICATIONS

This Application is a continuation-in-part of and claims priority to U.S. patent application Ser. No. 15/383,959, filed on Dec. 19, 2016, to Alan G. VanNahmen et al. entitled "System and Method for Converting Cutting and Gathering System of a Corn Head," currently pending, which claims priority to U.S. Provisional Patent Application Ser. No. 62/386,970, filed on Dec. 18, 2015, to Alan G. VanNahmen et al. entitled "Crop Cutting and Gathering System Adaption for a Corn Head and Row Crop Head," and which also claims priority to U.S. Provisional Patent Application Ser. No. 62/430,153, filed on Dec. 5, 2016 to Alan G. VanNahmen et al. entitled "System for Converting Cutting and Gathering System of a Corn Head," currently pending. This application also claims priority to U.S. Provisional Patent Application Ser. No. 62/430,153, filed on Dec. 5, 2016 to Alan G. VanNahmen et al. entitled "System for Converting Cutting and Gathering System of a Corn Head," currently pending. The entire disclosures, including the specifications and drawings, of all above-referenced applications are incorporated herein by reference.

BACKGROUND

Agricultural combines are typically equipped with a harvesting head attached to the forward end thereof. Conventional corn heads in particular include a number of row units designed to remove ears of corn from the stalks as the combine moves through the field. To do this, the rows of corn must be guided into narrow gaps of the row units that extend across the width of the head. Conventional row units include stalk rolls for pulling the corn stalks through a slot or throat such that the ears of corn are removed from the stalks as the ears come into engagement with opposing deck plates mounted to the row units. Gathering chains with lugs guide the corn stalks into the throat so that the ears may be removed. In this manner, corn heads are particularly designed for harvesting corn, but are not well suited for harvesting other crops such as sorghum, milo, millet, sunflowers, soybeans, bio-mass crops, and other "cut and harvest" row crops.

Used corn heads can often be acquired on the used or secondary market for a fraction of the cost of a new corn head. However, many of the components of such used corn heads, such as the stalk rolls, trash knives, and deck plates may be worn to a significant degree. Thus, absent costly maintenance and repair, the useful life of a used corn head may be limited. Additionally, many of the components of a conventional corn head, such as the stalk rolls, cast stock roll housings, and trash knives, add significant weight to the corn head thereby affecting the fore-aft stability of the combine both in the field and on the road. Furthermore, other types of harvesting heads, such as rigid platform heads, are not particularly well suited for harvesting down crop.

In addition, it is also often desirable to harvest different crops by cutting their stalks at different heights. For example, it is desirable to cut the stalks of some crops, such as sorghum, such that a signification portion of the stalk is left at the ground (e.g., 12 inches of stalk or more in some cases) and less of the stalk and material other grain (MOG) is taken into the combine. In other cases, it is desirable to cut the stalks of other crops, such as soybeans, closer to the ground in order to ensure that low-hanging pods are harvested, for example.

Accordingly, a need exists for a system and method for converting a corn head such that it can be used to harvest a variety of row crops other than corn. A need also exists for an improved harvesting head designed to pick up and gather downed row crops, while also leaving significant portions of the stalks at the ground. A further need exists for a harvesting head designed to harvest a variety row crops at various desirable heights, and that may also be converted back to a conventional corn head.

SUMMARY OF THE INVENTION

One embodiment of the present invention is generally directed to a kit for converting the cutting and gathering system of a harvesting head, such as a corn head or row crop head. More specifically, this first embodiment is directed to a system for modifying row units of a harvesting head to include counter-rotating cutting disks in a position to harvest corn, sorghum, milo, millet, sunflowers, soybeans, bio-mass crops and other "cut and harvest" row crops. Each kit may include a pair of cutting disks, right angle gear sets and drive shafts adapted for rotatably mounting each cutting disk to the frame of the row unit between an existing gathering chain drive sprocket and an existing idler sprocket. The kit may also include replacement deck plates. Various existing components such as stalk rolls, stalk roll housings and trash knives may optionally be removed from each row unit when the kit is installed. The kit can further include a cover plate that is installed onto a gearbox in place of a stalk roll housing.

Another aspect of the present invention is generally directed to a method for converting a corn head or row crop head though the addition of the counter-rotating cutting disks and the removal of the stalk rolls. In one embodiment of the method, the gathering chains are loosened and then removed. Holes can then be drilled through the frame of the row unit for rotatably mounting each cutting disk thereto in a location between the existing drive sprocket and the existing idler sprocket. In one configuration, the cutting disks are mounted closer to the drive sprockets than the idler sprockets, such that they are positioned near the rear of the row unit and are adapted for cutting crops, such as sorghum, at relatively greater heights. In another configuration, the cutting disks are mounted closer to the idler sprockets than the drive sprockets, such that they are positioned near the front of the row unit and are adapted for cutting crops, such as soybeans, at relatively lower heights. The existing deck plates may be removed and replacement deck plates may be installed in their place. The cover plate may be mounted to the gearbox in place of the stalk roll housing. The gathering chains can be retensioned.

A further aspect of the present invention is generally directed to a harvesting head for a combine that includes row units having cutting disks optionally located near the rear or near the front of the row units. These cutting disks may be positioned close to the ground to harvest certain "cut and harvest" row crops that grow near the ground.

Other and further objects of the invention, together with the features of novelty appurtenant thereto, will appear in the course of the following description.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views.

DESCRIPTION OF THE PREFERRED EMBODIMENT

Figure 1:
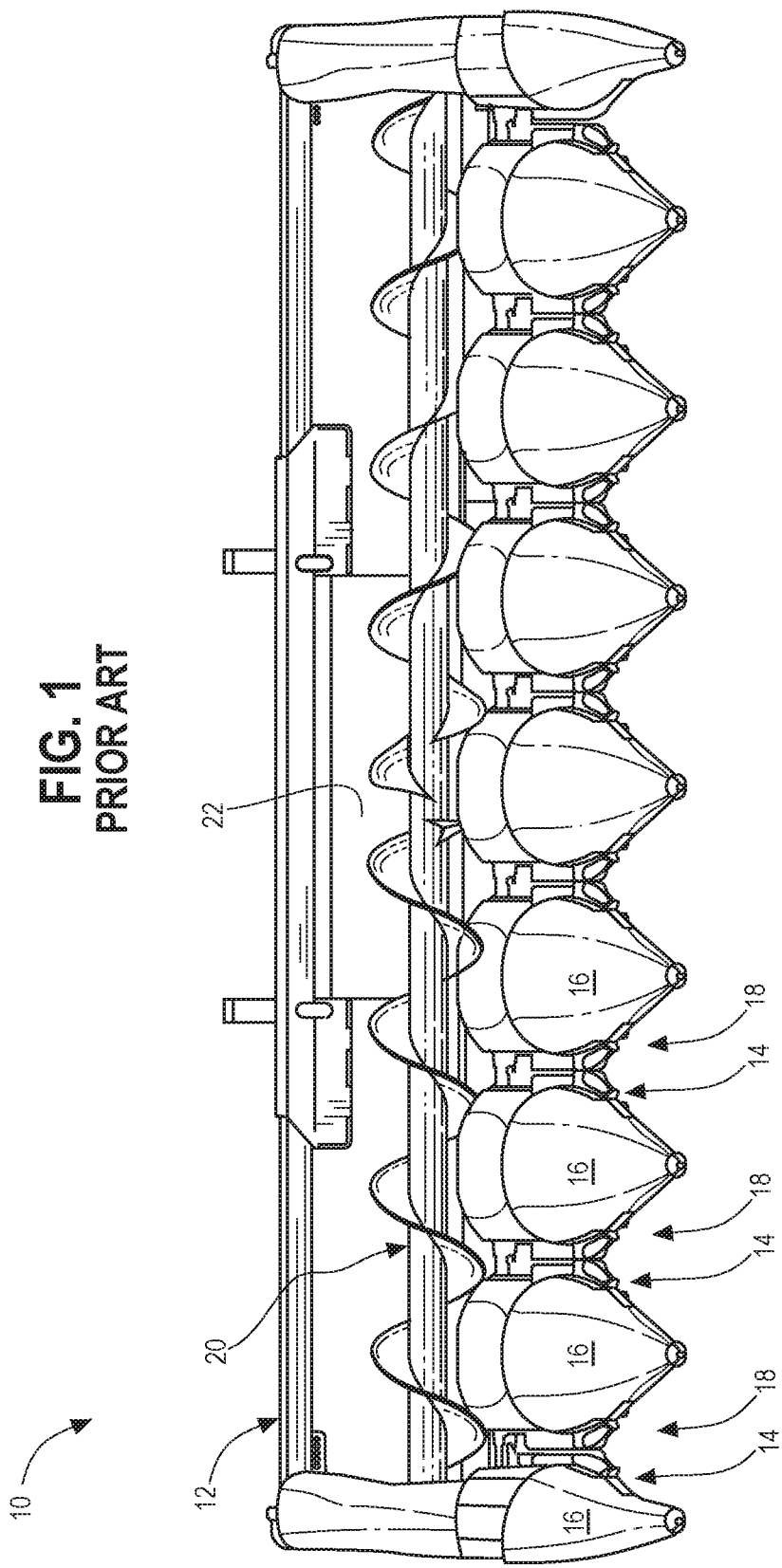
FIG. 1 is a front view of a conventional corn head or row crop head adapted for attachment to an agricultural combine and having a plurality of row units suitable for modification by the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures. It will be appreciated that any dimensions included in the drawing figures are simply provided as examples and dimensions other than those provided therein are also within the scope of the invention.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

One aspect of the present invention is directed generally to a kit for converting the cutting and gathering system of one or more row units of a corn head or row crop head. Another aspect of the present invention is directed generally to a method for converting, retrofitting or modifying one or more row units of a corn head or row crop head. A further aspect of the present invention is directed to an improved corn head or row crop head.

FIG. 1 illustrates a conventional corn head 10 adapted for attachment to an agricultural combine (not shown). The corn head 10 comprises a frame 12 and a plurality of row units 14 spaced apart from one another and extending from the frame 12 in a forward direction. The corn head 10 also includes a plurality tapered crop dividers or snouts 16 defining longitudinal passages 18 therebetween through which respective rows of crops are directed to the row units 14. The snouts 16 may be pivoted or otherwise raised upwardly into a maintenance position thereby allowing an operator to better access the row units 14 located partially thereunder. A cross auger 20 behind the row units 14 conveys crop material toward an opening 22 so that the crop may be fed into the feederhouse (not shown) of the combine. It will be appreciated that FIG. 1 is also representative of a row crop head as further described below. While the corn head 10 of FIG. 1 includes eight row units 14, it will be understood that the number of row units 14 may be different than eight, and that the present invention is suitable for use with corn heads 10 and row crop heads having any number of row units 14.

Figure 2:
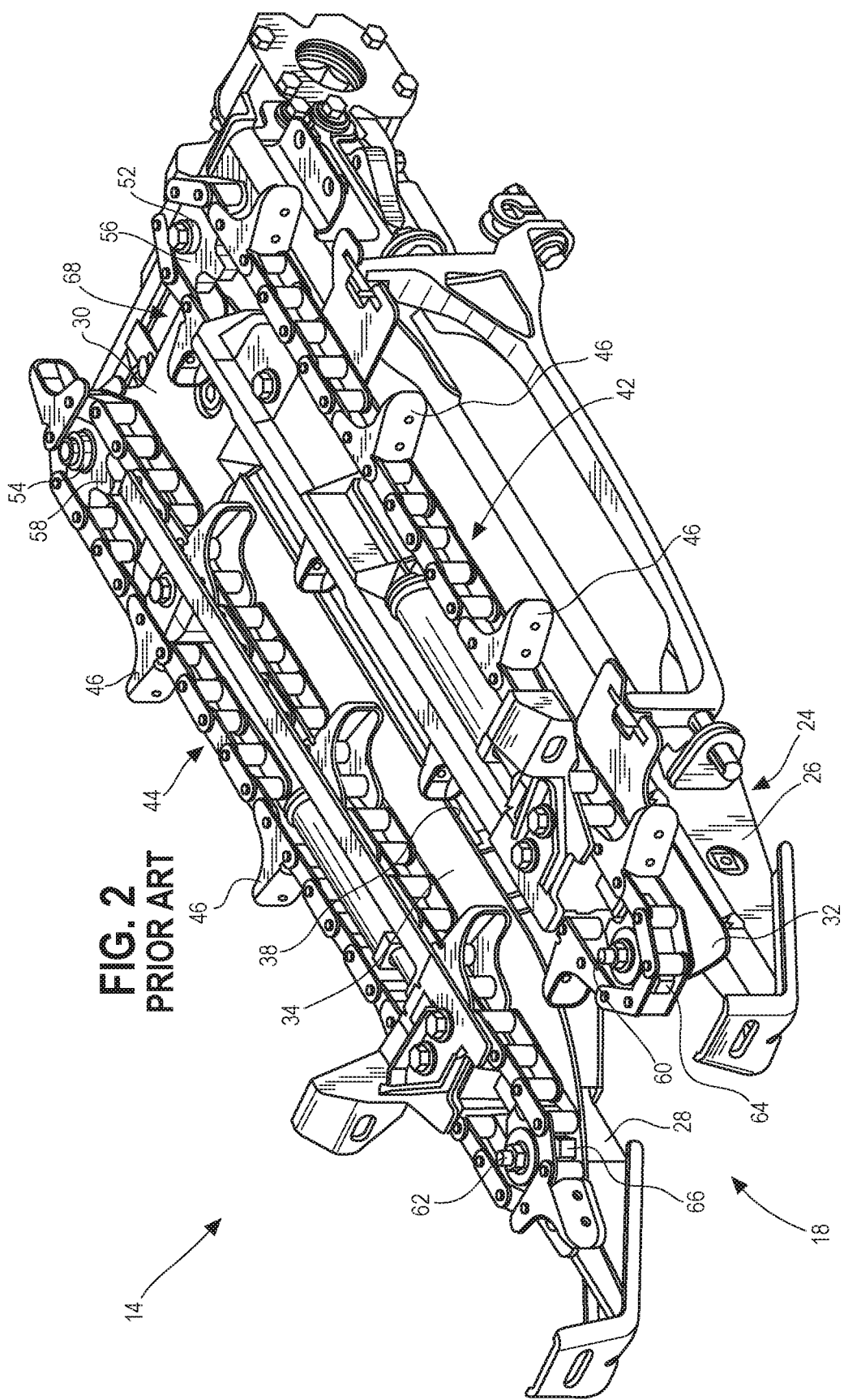
FIG. 2 is a left front perspective view of a row unit of a conventional corn head suitable for modification by the present invention.

FIG. 2 shows an embodiment of a conventional row unit 14. This row unit 14 includes a U-shaped frame 24 (illustrated more clearly in FIG. 4) having left and right longitudinally extending arms or legs 26 and 28 connected to one another by a rear cross member 30. Left and right stripper plates or deck plates 32 and 34 are attached to the upper surfaces of the left and right legs 26 and 28, respectively. The deck plates 32 and 34 can be mounted to the legs 26 and 28 using fasteners. The deck plates 32 and 34 have spaced apart opposing inner edges 36 and 38 (illustrated more clearly in FIG. 3) defining a gap or throat 40 therebetween for receiving the stalks of the crop. Each throat 40 is generally aligned with a passage 18.

Gathering chain assemblies having endless chains 42 and 44 and a series of projecting fingers or lugs 46 are applied to each leg 26 and 28 of the frame 24. The gathering chains 42 and 44 are driven in a counter-rotating manner such that the lugs 46 engage and draw the stalks of the crop from the passage 18 into the throat 40 during the harvesting process. Extending upwardly from openings 48 and 50 (illustrated more clearly in FIG. 4) of the frame 24 are drive shafts 52 and 54 having drive sprockets 56 and 58 mounted thereon. Mounted to tensioning mechanisms at forward regions of the legs 26 and 28 are shafts 60 and 62 having idlers sprockets 64 and 66 mounted thereon. The left gathering chain 42 forms an endless loop around the left drive sprocket 56 and left idler sprocket 64. Similarly, the right gathering chain 44 forms an endless loop around the right drive sprocket 58 and right idler sprocket 66. The drive sprockets 56 and 58 are driven by a gearbox 68 in opposite or counter-rotating directions such that the lugs 46 projecting toward the center of the row unit 14 move in a generally linear manner from the forward end to the rearward end of the row unit 14.

Figure 3:
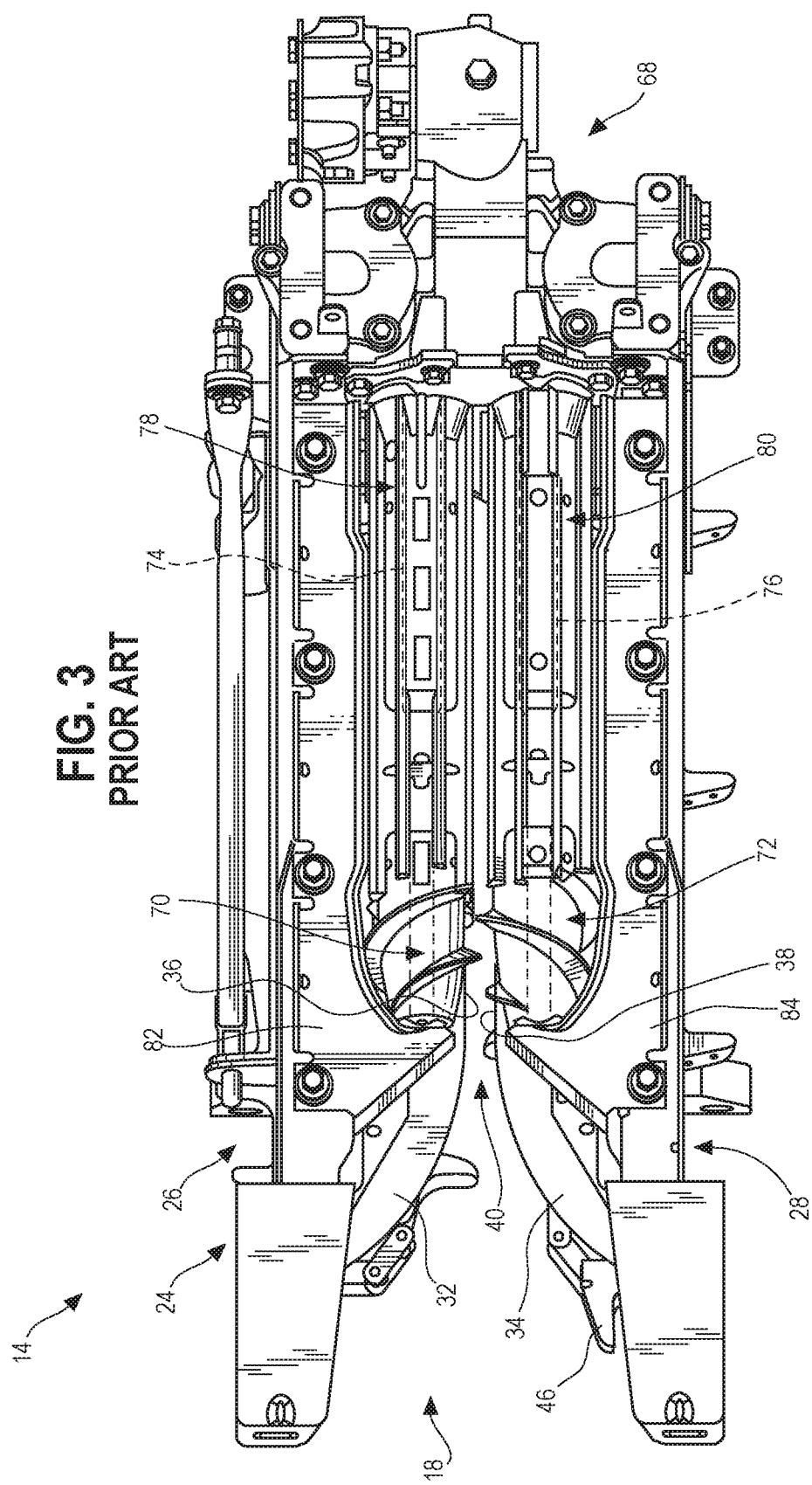
FIG. 3 is a bottom view of the row unit of FIG. 2.
Figure 4:
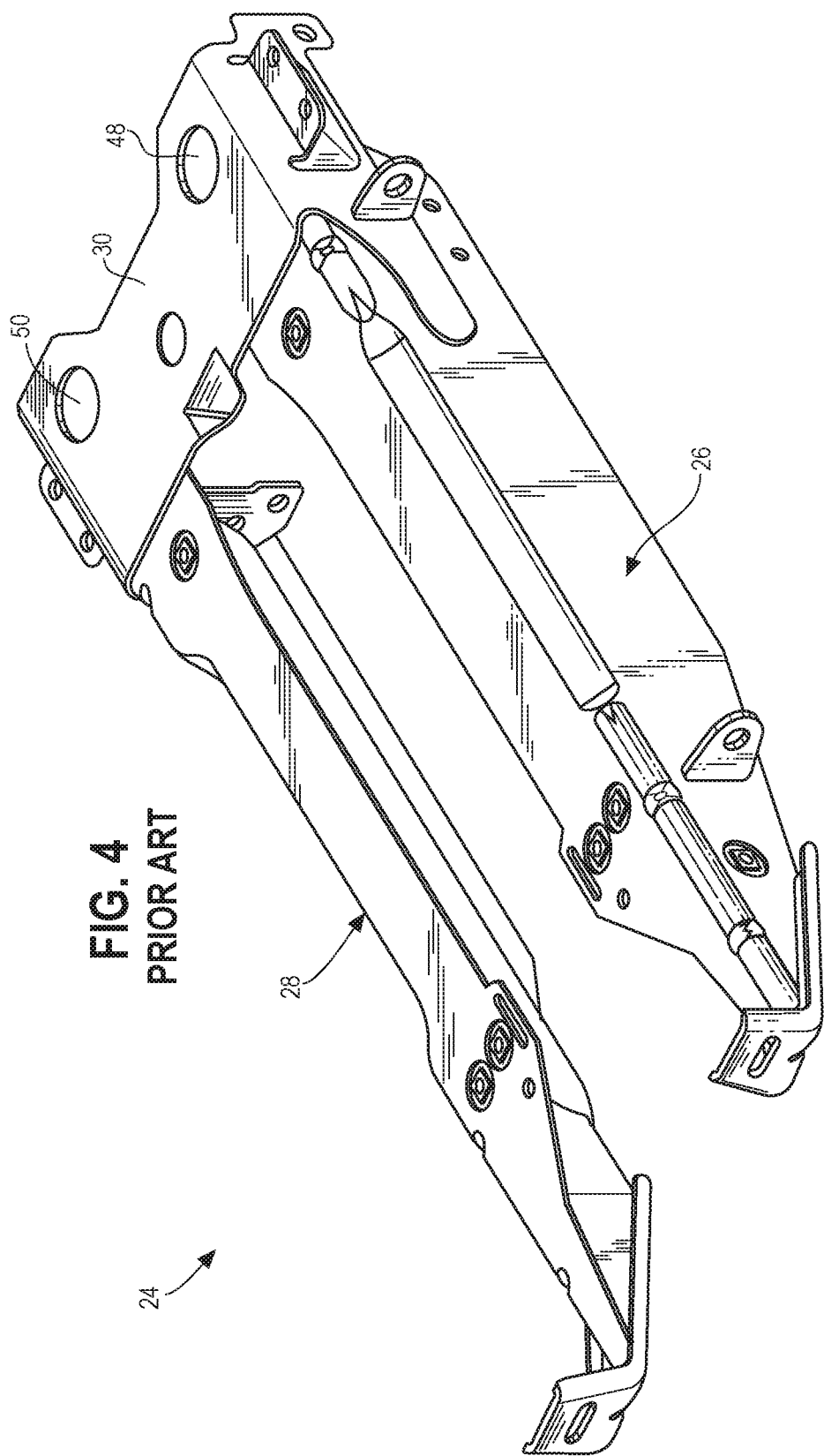
FIG. 4 is a left front perspective view of a frame of the row unit of FIG. 2.

As best seen in FIG. 3, a pair of longitudinally-extending snapping rolls or stalk rolls 70 and 72 are located generally underneath the deck plates 32 and 34. The stalk rolls 70 and 72 are mounted to drive shafts 74 and 76 (shown in broken lines) extending from housings 78 and 80 that are mounted to and project forwardly from the gearbox 68. The stalk rolls 70 and 72 are driven by the gearbox 68 in counter-rotating directions so as to draw the stalks of the crop downward through the throat 40. As the stalks are pulled downwardly, portions of the crop (e.g., ears of corn) which are too large to pass through the throat 40 become detached from the stalks. Attached to a bottom side and extending inwardly from each leg 26 and 28 are trash knives 82 and 84. The trash knives 82 and 84 extend the length of the stalk rolls 70 and 72 in order to prevent debris from becoming tangled about the stalk rolls 70 and 72.

As set forth above, the present invention is suitable for use with both corn heads 10 and row crop heads. Row crop heads include row units that are generally similar in nature to the row unit 14 illustrated in FIGS. 2 and 3. However, instead of having lugs 46 attached to the gathering chains 42 and 44, the row units of row crop heads are often equipped with flat gathering belts or the like which may be attached to the gathering chains 42 and 44, often in a generally corrugated, oscillating, chevron, or wave-like manner using mounting clips or other fasteners.

Figure 5:
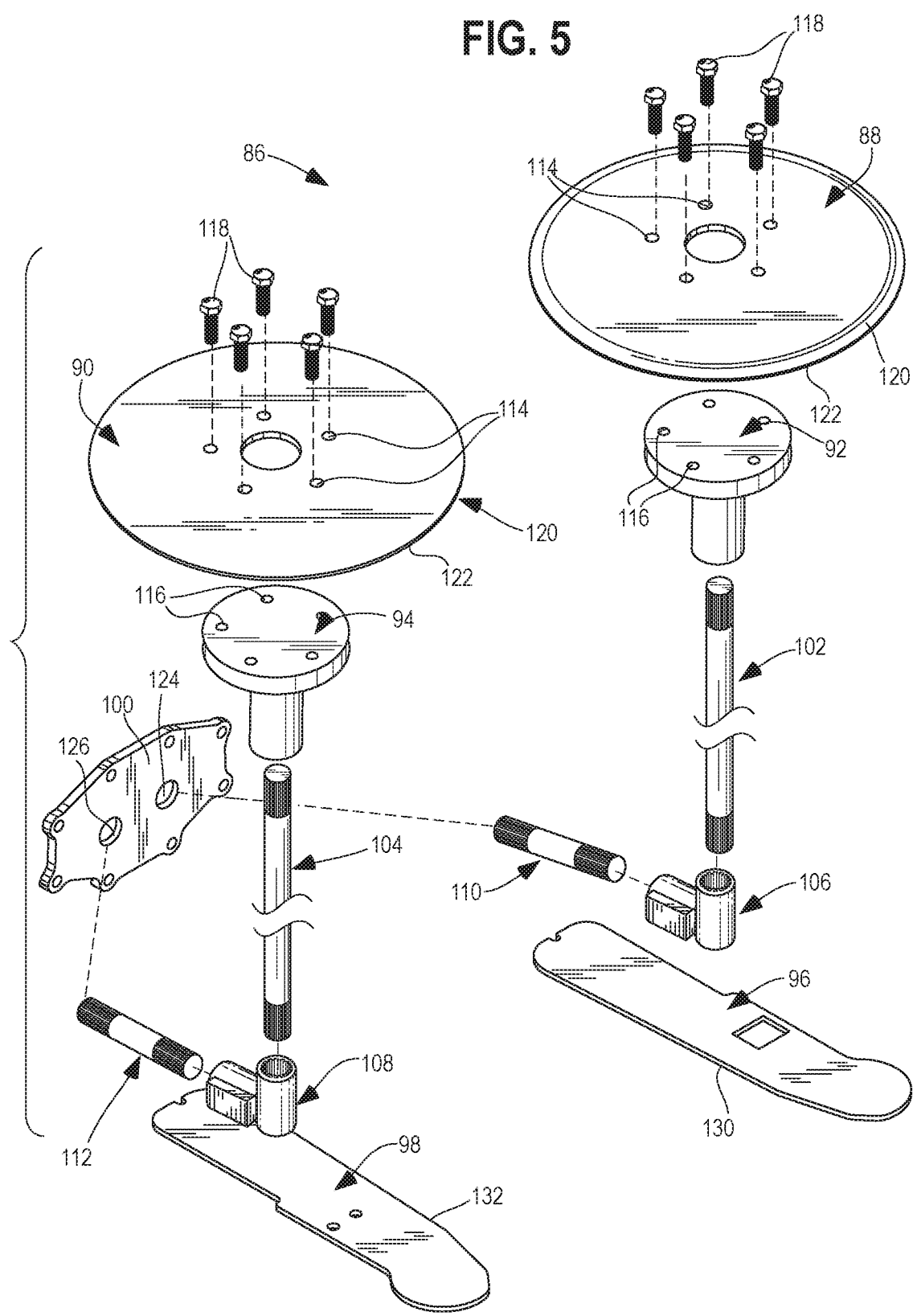
FIG. 5 is an exploded top perspective view of a kit for converting a row unit of a corn head, the kit including cutting disks, hubs, vertical drive shafts, right angle gear cases, horizontal drive shafts, and replacement deck plates in accordance with one embodiment of the present invention.

FIG. 5 illustrates one embodiment of a retrofitting or conversion kit 86 in accordance with the present invention that may be applied to a row unit 14 of a harvesting head 10. Various embodiments of the conversion kit 86 may be implemented to convert, modify, repurpose and/or retrofit harvesting heads sold by various original equipment manufacturers (OEM) such as, for example, John Deere, AGCO, Case IH, New Holland, Geringhoff, Bish Enterprises and Claas. In one embodiment, the kit 86 can be used to convert a corn head 10 such that it is suitable for harvesting crops in addition to corn, such as sorghum, milo, millet, sunflowers, soybeans, bio-mass crops, "cut and harvest" row crops and other crops now known or hereafter developed. The kit 86 can be particularly beneficial in that various worn components of an OEM harvesting head 10 may be removed and/or substituted with components of the kit 86, thereby not only extending the life of the harvesting head 10 but also reducing the weight of the harvesting head 10. Furthermore, the kit 86 may be designed such that its components can be temporarily installed and later removed from the harvesting head 10 thereby allowing it to be converted back to a standard corn head. It will further be appreciated that, in other instances, some or all of the components shown in FIG. 5 may be incorporated with new OEM harvesting heads, either as part of a base model or as optional feature, as opposed to being installed as part of a conversion process.

As shown in FIG. 5, the kit 86 may include left and right cutting disks 88 and 90, each having a corresponding hub 92 and 94 suitable for attachment or coupling thereto. Alternatively, each disk 88 and 90 and its corresponding hub 92 and 94 may be formed as a single component. The kit 86 can also comprise left and right replacement stripper or deck plates 96 and 98, an optional gearbox cover plate 100, left and right vertical drive shafts 102 and 104, left and right gear sets 106 and 108 that may each optionally be enclosed within in a right angle casing or housing, left and right horizontal drive shafts 110 and 112, and associated hardware.

The cutting disks 88 and 90 may each include a plurality of mounting holes 114 arranged in alignment with a plurality of mounting holes 116 in the hubs 92 and 94. Fasteners, such as bolts or screws 118, can be used to secure each cutting disk 88 and 90 to its respective hubs 92 and 94. In one embodiment, the holes 116 in the hubs 92 and 94 are threaded and the screws are inserted through the holes 114 of the cutting disks 88 and 90 and threaded into the hubs 92 and 94. In other embodiments, the screws 118 may be combined with nuts (not shown) to secure the hubs 92 and 94 to the cutting disks 88 and 90. As shown, the cutting disks 88 and 90 each have a beveled portion 120 to form a circumferential edge 122 suitable for cutting the stalks of the crop being harvested. In other embodiments, the cutting disks 88 and 90 may have beveled, smooth, serrated, jagged, notched, scalloped and/or saw-toothed peripheral regions to facilitate cutting of the stalks as the cutting disks 88 and 90 rotate. The cutting disks 88 and 90 may be identical in size and shape or may be of differing sizes and shapes.

Each hub 92 and 94 can include a collar portion for connection with a vertical drive shaft 102 and 104 and a radial flange portion having a plurality of mounting holes 116 therein for connection with a cutting disk 88 and 90.

As illustrated in FIG. 5, each of the drive shafts 102, 104, 110 and 112 may be are splined and include longitudinally-extending splines or teeth protruding radially from the exterior surfaces thereof. Likewise, the hubs 92 and 94 and gear sets 106 and 108 can each include corresponding internal splines or teeth which mate with the external splines or teeth of the drive shafts 102, 104, 110 and 112. In other embodiments, the drive shafts 102, 104, 110 and 112, hubs 92 and 94, and gear sets 106 and 108 may include other suitable means for engagement and connection, including but not limited to connections having polygonal cross-sections (e.g., hexagonal, square, etc.), keyed connections, connections utilizing fasteners, or any other suitable form of connection. It will further be appreciated that one end of each horizontal drive shaft 110 and 112 may be adapted for engagement and connection with the gearbox 68. For example, one end of each horizontal drive shaft 110 and 112 may be of a structure or shape allowing for engagement with the gearbox 68 in place of the stalk roll drive shafts 74 and 76, once the stalk roll drive shafts 74 and 76 are removed, as will be further described below. In such an instance, the gearbox cover plate 100 may have left and right holes 124 and 126 formed therein suitable for receiving the horizontal drive shafts 110 and 112 therethrough.

In an alternative embodiment, the stalk roll drive shafts 74 and 76 may be adapted for connecting with and driving the right angle gear sets 106 and 108. In this embodiment, the stalk roll drive shafts 74 and 76 are not removed, and the horizontal drive shafts 110 and 112 are not necessary.

Figure 6:
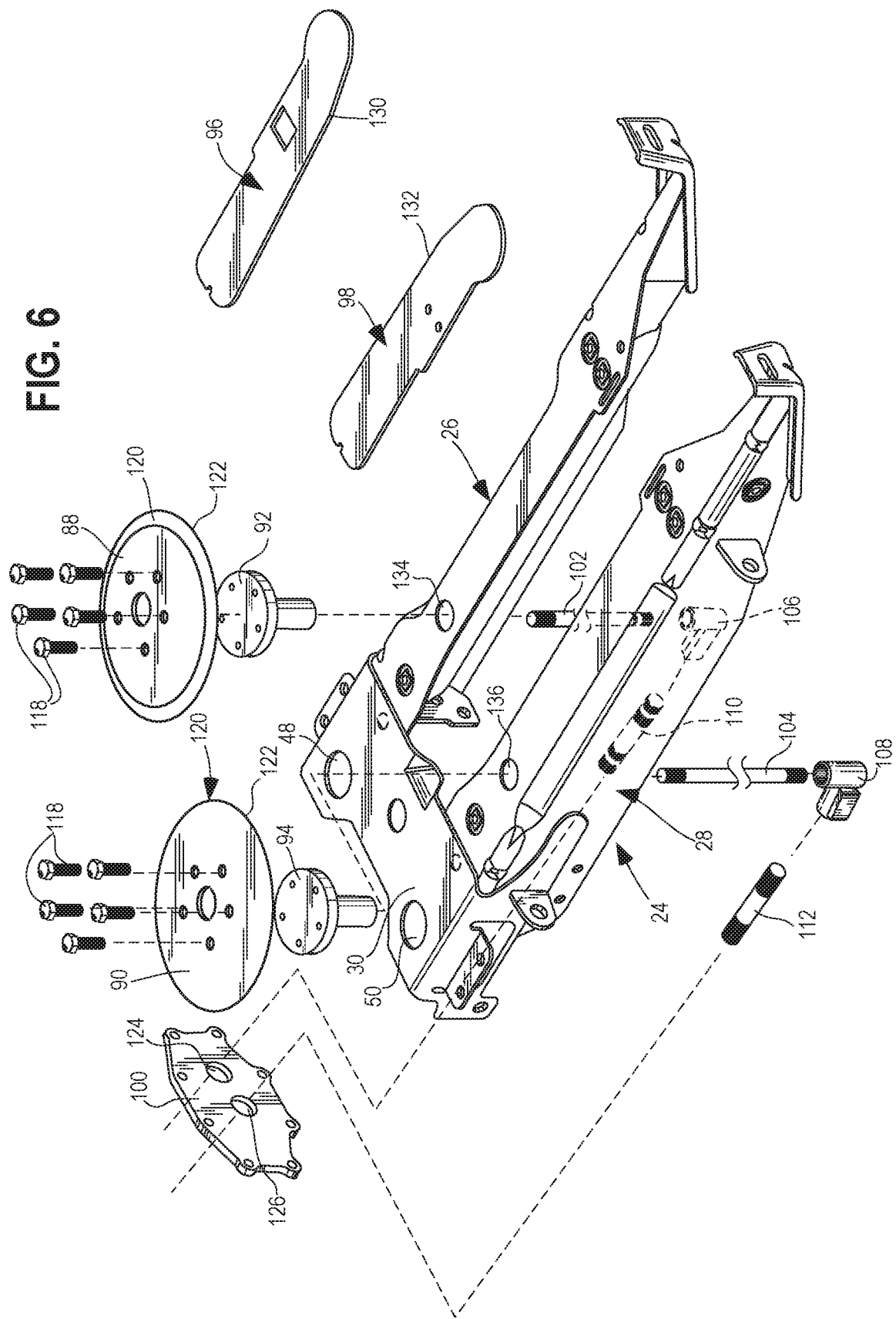
FIG. 6 is an exploded right front perspective view of a row unit frame and the kit of FIG. 5 in accordance with one embodiment of the present invention.

Turning attention to FIG. 6, the components of the kit 86 are shown in an exploded state prior to be assembled with the row unit frame 24. As described in more detail below, holes 134 and 136 may be drilled or otherwise formed into the upper surfaces of the left and right legs 26 and 28, respectively, of the frame 24 if such holes are not already provided therein. The newly drilled holes 134 and 136 are located such that the cutting disks 88 and 90 can be located generally longitudinally between the existing respective drive sprockets 56 and 58 and idler sprockets 64 and 66.

As discussed in greater detail below, in the embodiment depicted in FIGS. 5-7, the cutting disks 88 and 90 can be located above the row unit frame 24 and positioned toward the rear of the frame 24. While not shown, a bearing assembly may be provided in order to mount the hubs 92 and 94 and/or vertical drive shafts 102 and 104 to the row unit frame 24. These bearing assemblies and their associated mounting hardware (not shown) may also be a part of the kit 86.

Figure 7:
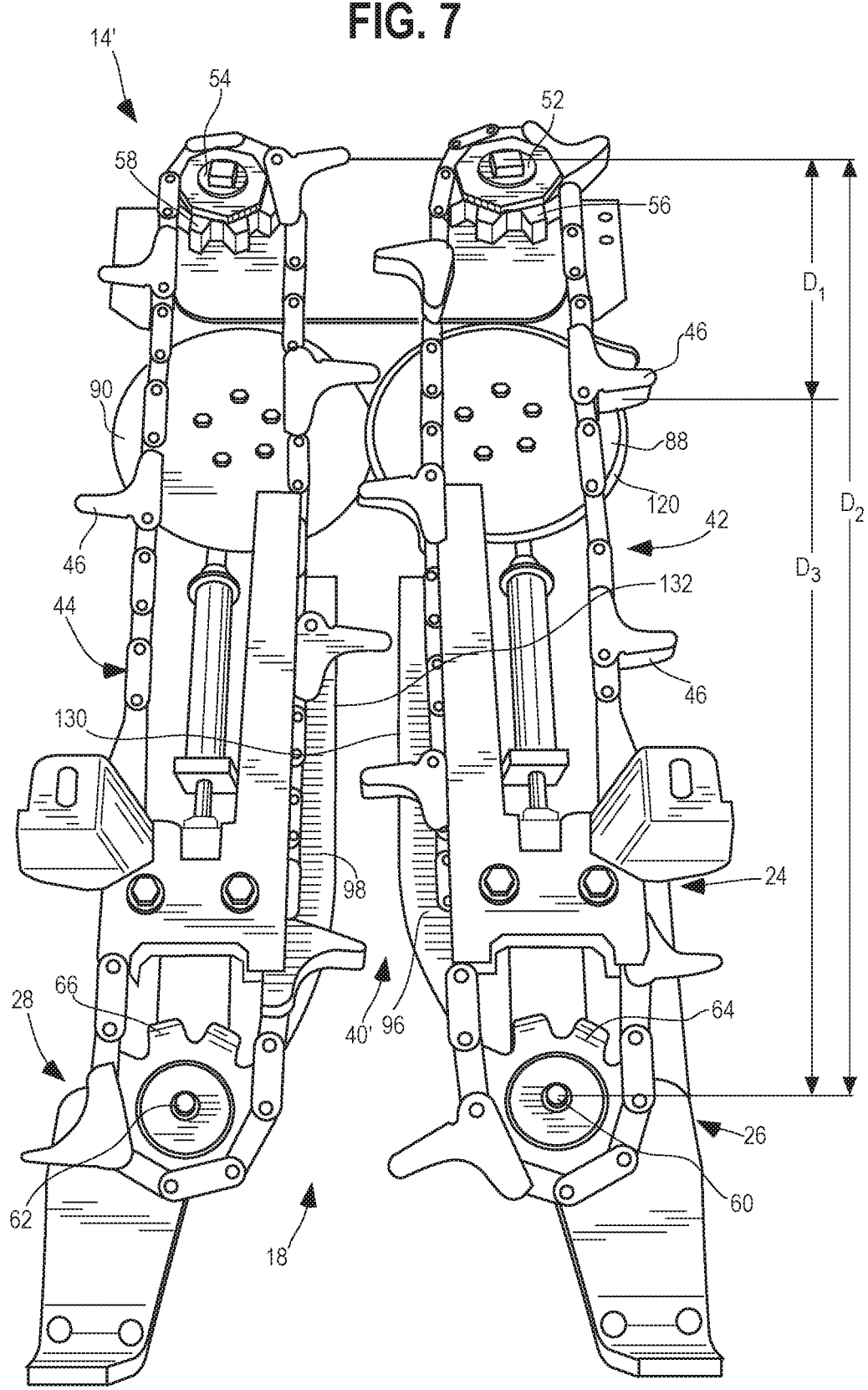
FIG. 7 is a schematic top perspective view of a row unit after it has been converted or retrofitted with the kit of FIG. 5 in accordance with one embodiment of the present invention.

FIG. 7 is a schematic illustration of a row unit 14' that has been converted in accordance with one embodiment of the present invention. In this converted row unit 14', the cutting disks 88 and 90 are rotatably mounted above the row unit frame 24 and in a slightly overlapping orientation. The left cutting disk 88 is shown as positioned above the right cutting disk 90, although in other embodiments the left cutting disk 88 may be positioned beneath the right cutting disk 90. As shown, the left cutting disk 88 is mounted such that its beveled portion 120 faces upward, and the right cutting disk 90 is mounted such that its beveled portion 120 faces downward. This results in the unbeveled surfaces of the cutting disks 88 and 90 being generally engaged with one another similar in nature to the two blades of a pair of scissors.

As depicted in FIG. 7, each cutting disk 88 and 90 is located generally longitudinally between the respective drive sprocket 56 and 58 and idler sprocket 64 and 66. For example, as shown, the centerline of the left drive sprocket 56 is longitudinally located a distance $D_1$ from the centerline of the left idler sprocket 64. The centerline of the left cutting disk 88 is longitudinally located a distance $D_2$ from the centerline of the left drive sprocket 56 and is longitudinally located a distance $D_3$ from the centerline of the left idler sprocket 64. The ratio of distance $D_2$ to distance $D_1$ can be between about 0.1 and about 0.4 in one embodiment, between about 0.15 and about 0.35 in another embodiment, and between about 0.2 and about 0.3 in a further embodiment. Put differently, the ratio of distance $D_3$ to distance $D_1$ can be between about 0.6 and about in one embodiment, between about 0.65 and about 0.85 in another embodiment, and between about 0.7 and about 0.8 in a further embodiment. The longitudinal locations, spacings and ratios of the centerlines of the right drive sprocket 58, right cutting disk 90, and right idler sprocket 66 may be the same or generally similar to those of the left side.

Further, as depicted in FIG. 7, the left gathering chain 42 is looped around the left drive sprocket 56 and the left idler sprocket 64. Similarly, the right gathering chain 44 is looped around the right drive sprocket 58 and the right idler sprocket 66. As the lugs 46 engage and draw the stalks of the crop from the passage 18 into the throat 40' during the harvesting process, the stalks come into contact with one or both of the counter-rotating cutting disks 88 and 90 in order to be cut. Due to the position of the cutting disks 88 and 90 near the rear of the row unit 14', the stalks are cut near the rear of the row unit 14' thereby leaving more of the stalk at the ground (e.g., 12 inches of stalk or more in some cases) and taking in less stalk and material other grain (MOG) into the combine. A reduction in MOG into the combine leads to greater efficiency, less wear on the combine, and less need to reduce the ground speed of the combine while harvesting. Further, with less MOG being fed into the combine, the internal loading of the combine is reduced and therefore there may be less grain loss. Leaving an increased amount of uncut stalk on the ground also promotes soil conservation as it reduces wind and water erosion. This further leaves more stalk on the ground which may be beneficial in areas of sugarcane aphid (SCA) infestation, leaves more stalk available for grazing, and promotes ground cover in recreational hunting environments. It will be appreciated that the configuration illustrated in FIG. 7 having the cutting disks 88 and 90 near the rear of the row unit 14' may be desirable when harvesting crops such as sorghum.

The converted row unit 14' shown in FIG. 7 includes the left and right replacement deck plates 96 and 98, which have spaced-apart opposing inner edges 130 and 132 defining a gap or throat 40' therebetween for receiving the stalks of the crop. The throat 40' is generally aligned with the passage 18. The throat 40' of the converted row unit 14' may have a width that is greater than or less than the width of the throat 40 of the original row unit 14. The replacement deck plates 96 and 98 may also be of a different size and shape as compared to the original deck plates 32 and 34 and may further be designed to permit the installation of the cutting disks 88 and 90. Additionally, as demonstrated in FIG. 7, the stalk rolls 70 and 72, stalk roll housings 78 and 80 and stalk roll drive shafts 74 and 76 have been removed. Further, the trash knives 82 and 84 can be removed from the converted row unit 14' as well.

In this embodiment, as best shown in FIG. 6, the left and right cutting disks 88 and 90 are attached to the left and right hubs 92 and 94. The left and right hubs 92 and 94 are coupled to the left and right encased right angle gear sets 106 and 108 via the left and right vertical drive shafts 102 and 104. The left and right encased right angle gear sets 106 and 108 are coupled to the gearbox 68 via the left and right horizontal drive shafts 110 and 112. The gearbox 68 drives the left and right encased gear sets 106 and 108, which causes the cutting disks 88 and 90 to be driven in opposite, counter-rotating directions. Accordingly, the left cutting disk 88 may be driven in a clockwise direction, while the right cutting disk 90 is driven in a counterclockwise direction. Further, the gearbox cover plate 100 can be been mounted to the gearbox 68 in place of stalk roll housings 78 and 80 such that the left and right horizontal drive shafts 110 and 112 pass through the holes 124 and 126.

Turning attention now to the method for converting a harvesting head 10, the crop dividers or snouts 16 are first raised in order to gain access to the row units 14. The gathering chain tensioning/adjusting mechanisms may be loosened so that the gathering chains 42 and 44 can be loosened and/or removed. The original deck plates 32 and 34 and idler sprockets 64 and 66 may then be removed. The trash knives 82 and 84 may also be removed. The stalk rolls 70 and 72 may then be removed. Next, the stalk roll housings 78 and 80 with stalk roll drive shafts 74 and 76 may be removed.

A template may optionally be placed on the upper surfaces of the frame legs 26 and 28 in order to mark and/or drill pilot holes for holes 134 and 136. Holes 134 and 136 can then be drilled or otherwise formed through the upper surfaces of the legs 26 and 28 of the frame 24 if not already provided.

The left and right horizontal drive shafts 110 and 112 may be connected with the row unit gearbox 68. The gearbox cover plate 100 can be attached to the gearbox 68 in place of the removed cast stalk roll housing body. The left and right horizontal drive shafts 110 and 112 can pass through holes 124 and 126 in the gearbox cover plate 100. The left and right horizontal drive shafts 110 and 112 may be connected with the left and right encased right angle gear sets 106 and 108, and the gear sets 106 and 108 may be mounted to the row unit frame 24. The left and right vertical drive shafts 102 and 104 are connected with the left and right gear sets 106 and 108, and may pass upwardly through holes 134 and 136 defined in the legs 26 and 28. The hubs 92 and 94 are connected to the left and right vertical drive shafts 102 and 104 and may be mounted to the row unit frame 24. The cutting disks 88 and 90 can be mounted to the hubs 92 and 94. In some embodiments, modified gathering chain guides and/or stalk guides are also installed. The replacement deck plates 96 and 98 and idler sprockets 64 and 66 can then be installed. Next, the gathering chains 42 and 44 are reinstalled and retightened or retensioned, as necessary. It will be appreciated that the steps of the method need not occur in the order described herein and that it is, in many cases, possible to complete the method by performing the steps in a different order.

Figure 8:
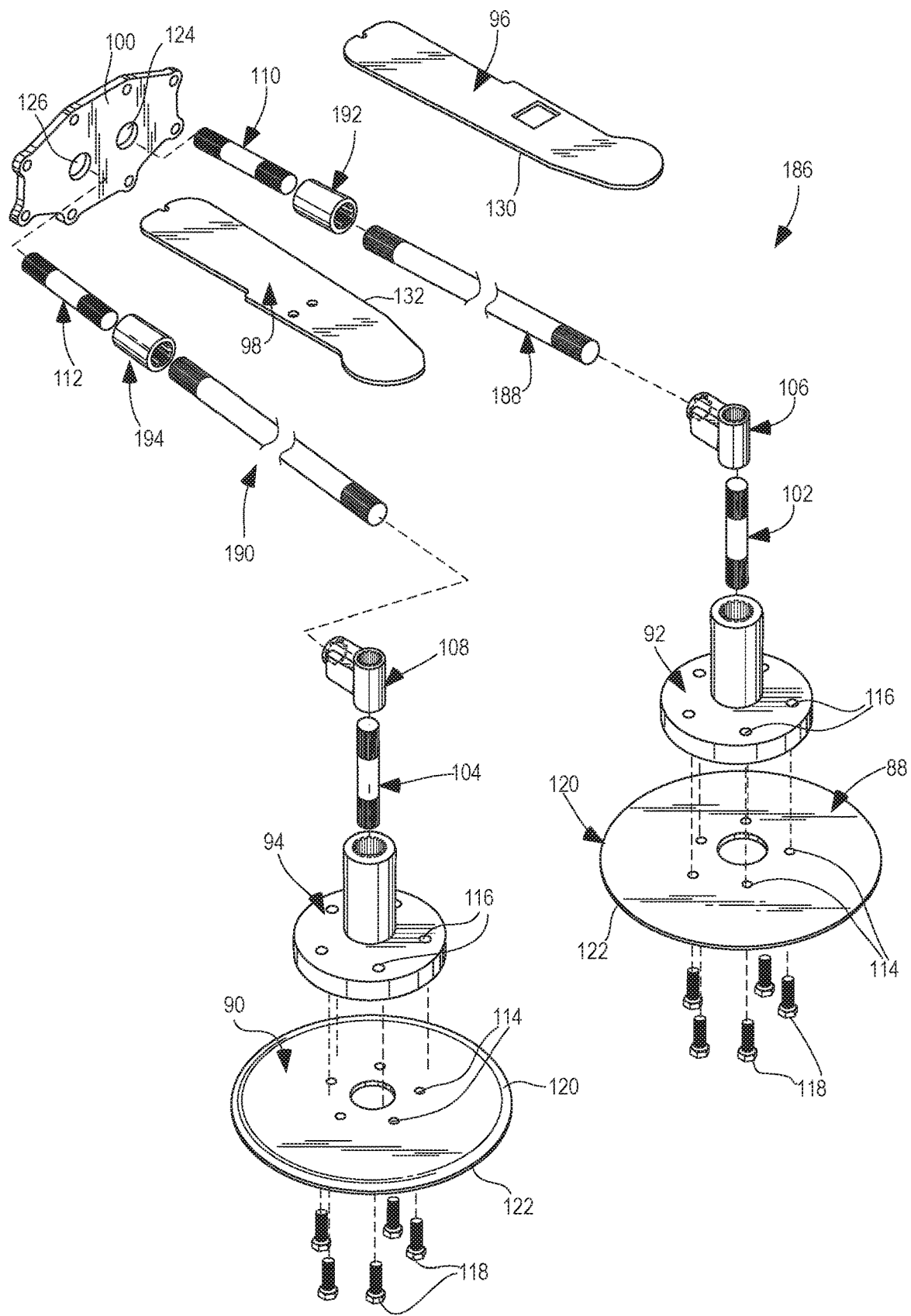
FIG. 8 is an exploded top perspective view of a kit for converting a row unit of a corn head, the kit including cutting disks, hubs, vertical drive shafts, right angle gear cases, horizontal drive shafts, horizontal extension shafts, shaft connection collars, and replacement deck plates in accordance with one embodiment of the present invention.

FIG. 8 illustrates a second embodiment of a retrofitting or conversion kit 186 in accordance with the present invention that may be applied to a row unit 14 of a harvesting head 10. The kit 186 includes many of the same components as kit 86, described above. However, as described in more detail below, kit 186 is adapted for positioning the cutting disks 88 and 90 generally beneath and near the front of the row unit 14". Such a configuration, which results in the cutting disks 88 and 90 being located in a lower position, may be desirable when harvesting crops such as soybeans, and particularly to ensure that low-hanging pods are harvested, for example. Due to the commonalties and similar nature of kits 86 and 186, primarily only the differences relating to kit 186 will be discussed below.

In addition to the components described relative to kit 86 above, kit 186 may optionally include left and right extension drive shafts 188 and 190. Kit 186 may also include left and right drive shaft connection collars 192 and 194 (with associated hardware, not shown) for connecting the extension drive shafts 188 and 190 to the horizontal drive shafts 110 and 112. Such extensions 188 and 190 may be necessary in order to transfer rotational power to the front of the row unit 14" in order to turn the cutting disks 88 and 90. Alternatively, longer horizontal drive shafts 110 and 112 may be provided such that the extension drive shafts 188 and 190 and connection collars 192 and 194 are not necessary.

Figure 9:
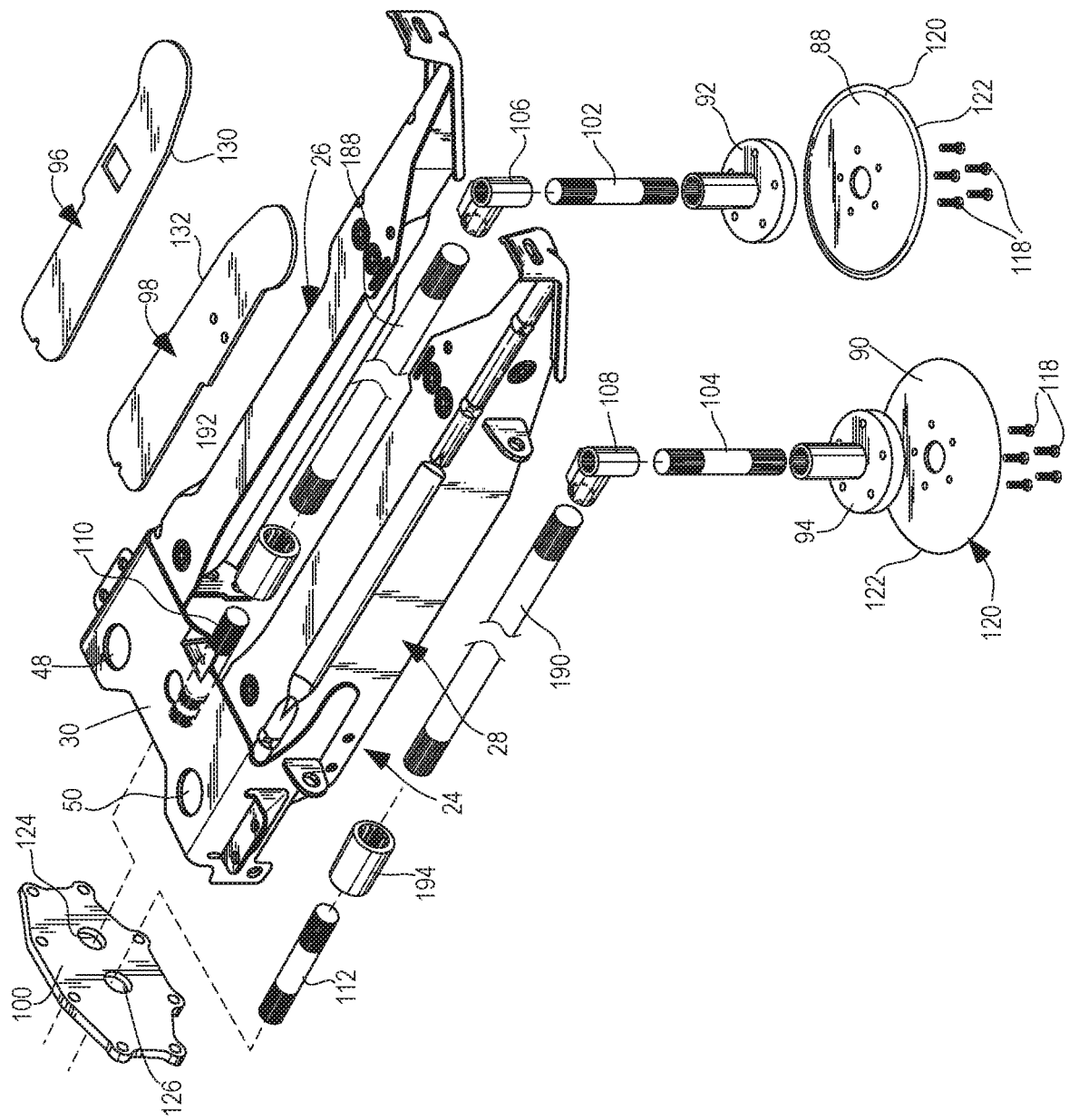
FIG. 9 is an exploded right front perspective view of a row unit frame and the kit of FIG. 8 in accordance with one embodiment of the present invention.

Turning attention to FIG. 9 the components of the kit 186 are shown in an exploded state prior to be assembled with the row unit frame 24.

Figure 10:
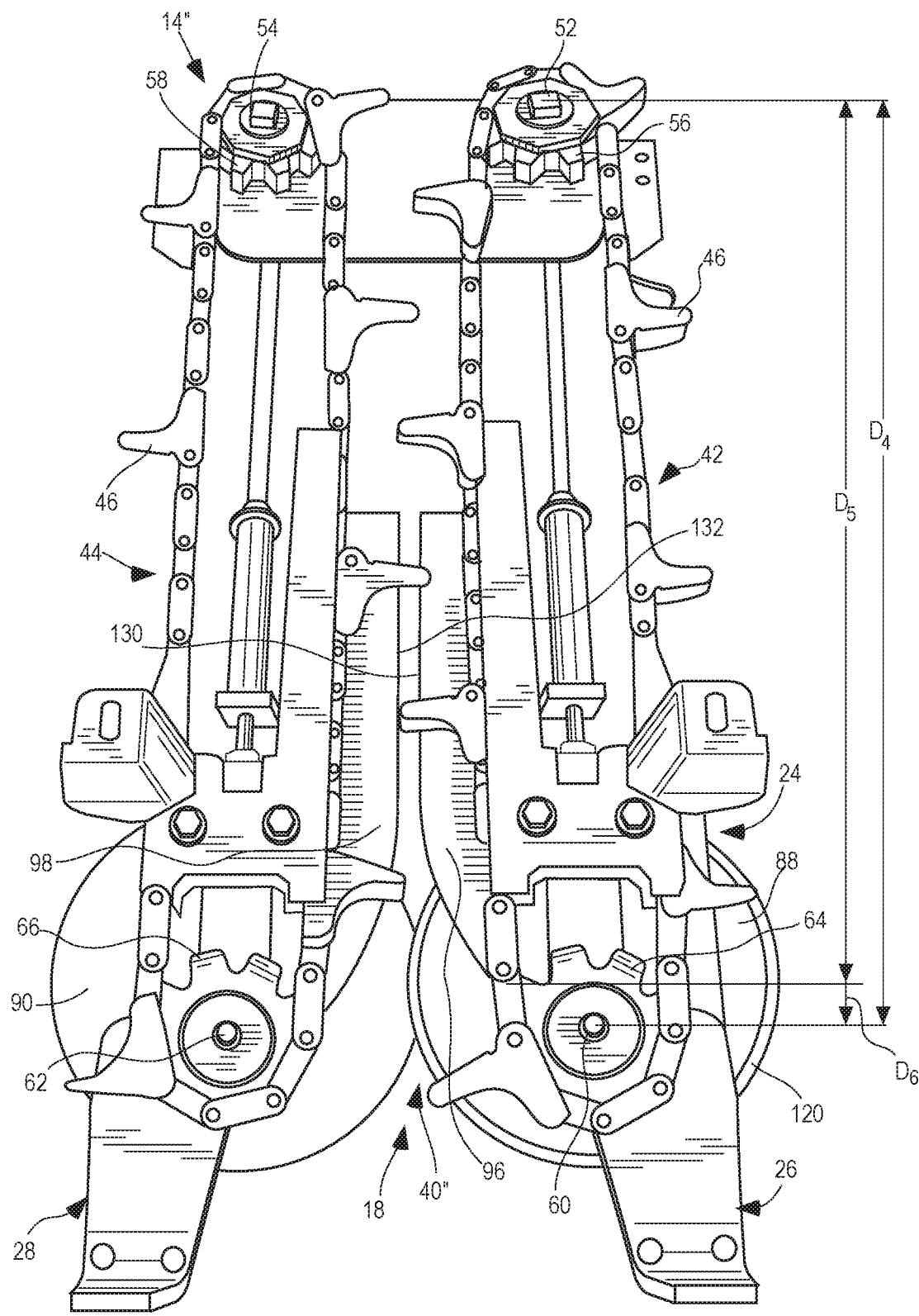
FIG. 10 is a schematic top perspective view of a row unit after it has been converted or retrofitted with the kit of FIG. 8 in accordance with one embodiment of the present invention.

FIG. 10 is a schematic illustration of a row unit 14" that has been converted in accordance with a second embodiment or configuration of the present invention. In this converted row unit 14", the cutting disks 88 and 90 are rotatably attached to the left and right encased right angle gear sets 106 and 108 so that the cutting disks 88 and 90 are positioned in a slightly overlapping orientation. The left cutting disk 88 is shown as positioned above the right cutting disk 90, although in other embodiments the left cutting disk 88 may be positioned beneath the right cutting disk 90. As shown, the left cutting disk 88 is positioned such that its beveled portion 120 faces upward, and the right cutting disk 90 is positioned such that its beveled portion 120 faces downward. This again results in the unbeveled surfaces of the cutting disks 88 and 90 being generally engaged with one another similar in nature to the two blades of a pair of scissors.

As depicted in FIG. 10, each cutting disk 88 and 90 is located generally longitudinally in-line with the respective drive sprocket 56 and 58 and idler sprocket 64 and 66. For example, as shown, the centerline of the left drive sprocket 56 is longitudinally located a distance $D_4$ from the centerline of the left idler sprocket 64. The centerline of the left cutting disk 88 is longitudinally located a distance $D_5$ from the centerline of the left drive sprocket 56 and is longitudinally located a distance $D_6$ from the centerline of the left idler sprocket 64. It will be appreciated that the cutting disks 88 and 90 may be mounted such that their respective centerlines are either slightly rearward of, or even forward of, the centerlines of the idler sprockets 64 and 66. Accordingly, the ratio of distance $D5$ to distance $D4$ can be between about 0.7 and about 1.2 in one embodiment, between about 0.8 and about 1.1 in another embodiment, and between about 0.9 and about 1.0 in a further embodiment. The longitudinal locations, spacings and ratios of the centerlines of the right drive sprocket 58, right cutting disk 90, and right idler sprocket 66 may be the same or generally similar to those of the left side.

Further, as depicted in FIG. 10, the left gathering chain 42 is looped around the left drive sprocket 56 and the left idler sprocket 64. Similarly, the right gathering chain 44 is looped around the right drive sprocket 58 and the right idler sprocket 66. As the lugs 46 engage and draw the stalks of the crop from the passage 18 into the throat 40" during the harvesting process, the stalks come into contact with one or both of the counter-rotating cutting disks 88 and 90 in order to be cut. Due to the position of the cutting disks 88 and 90 near the front of the row unit 14", the stalks are cut near the front of the row unit 14" thereby making it possible to harvest crops that are closer to the ground, such as soybeans.

The converted row unit 14" shown in FIG. 10 includes the left and right replacement deck plates 96 and 98, which have spaced-apart opposing inner edges 130 and 132 defining a gap or throat 40" therebetween for receiving the stalks of the crop. The throat 40" is generally aligned with the passage 18. The throat 40" of the converted row unit 14" may have a width that is greater than or less than the width of the throat 40 of the original row unit 14. Because the crops are cut near the front the row unit 14", it can be desirable for the spacing between the inner edges 130 and 132 of the deck plates 96 and 98 to be relatively small (or even nonexistent), so as to not let cut crops fall while being conveying by the gathering chains 42 and 44 to the auger 20.

In this embodiment, the left and right hubs 92 and 94 are coupled to the left and right encased right angle gear sets 106 and 108 via the left and right vertical drive shafts 102 and 104. The left and right encased right angle gear sets 106 and 108 are coupled to the gearbox 68 by the left and right extended drive shafts 188 and 190, the left and right drive shaft connection collars 192 and 194 and the left and right horizontal drive shafts 110 and 112. The gearbox 68 drives the left and right encased right angle gear sets, which causes the cutting disks 88 and 90 to be driven in opposite, counter-rotating directions. Accordingly, the left cutting disk 88 is driven in a clockwise direction, while the right cutting disk 90 is driven in a counterclockwise direction. Further, the gearbox cover plate 100 has been mounted to the gearbox 68 in place of housings 78 and 80.

Turning attention now to the method for converting a harvesting head 10 with kit 186, the method may be generally the same as outlined above relative to kit 86. However, it involves mounting the cutting disks 88 and 90 generally beneath and near the front of the row unit 14". The method can also include the additional steps of extending the left and right horizontal drive shafts 110 and 112 using left and right extended drive shafts 188 and 190 and left and right drive shaft connection collars 192 and 194. Unlike with the configuration shown in FIG. 6, holes 134 and 136 are not needed for the configuration shown in FIG. 9, as the left and right vertical drive shafts 102 and 104 do not extend through the frame legs 26 and 28.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for converting a corn head or a row crop head, the method comprising the steps of:
    removing stalk rolls from a row unit of the corn head or row crop head;
    mounting a cutting disk to a frame of the row unit; and
    coupling a right angle gear set between a row unit gearbox and the cutting disk such that the cutting disk is driven by the row unit gearbox through the right angle gear set.

2. The method of claim 1 further comprising the step of removing a stalk roll housing from the row unit gearbox.

3. The method of claim 2 further comprising the step of installing a cover plate on the row unit gearbox after the stalk roll housing is removed from the row unit gearbox.

4. The method of claim 1 further comprising the step of removing a stalk roll drive shaft from the row unit gearbox.

5. The method of claim 1 further comprising the step of coupling a first drive shaft between the row unit gearbox and the right angle gear set.

6. The method of claim 5 further comprising the step of coupling a second drive shaft between the right angle gear set and the cutting disk.

7. The method of claim 1, wherein the right angle gear set is enclosed within a casing.

8. The method of claim 1, wherein the cutting disk is located above the frame and is positioned between a drive sprocket and an idler sprocket.

9. The method of claim 8, wherein a centerline of the drive sprocket and a centerline of the idler sprocket are spaced a first distance apart from one another, wherein the centerline of the drive sprocket and a centerline of the cutting disk are spaced a second distance apart from another, and wherein a ratio of the second distance to the first distance is between 0.15 and 0.35.

10. The method of claim 8 further comprising the step of drilling a hole in the frame for receiving at least one of a shaft and a hub onto which the cutting disk is mounted.

11. The method of claim 1, wherein the cutting disk is located below the frame and is positioned between a drive sprocket and an idler sprocket.

12. The method of claim 11, wherein a centerline of the drive sprocket and a centerline of the idler sprocket are spaced a first distance apart from one another, wherein the centerline of the drive sprocket and a centerline of the cutting disk are spaced a second distance apart from another, and wherein a ratio of the second distance to the first distance is between 0.8 and 0.98.

13. The method of claim 1 further comprising the steps of:
    removing an original deck plate from the frame of the row unit; and
    installing a replacement deck plate on the frame of the row unit.

* * * * *